No. 779,578. PATENTED JAN. 10, 1905.
F. E. BOWERS.
TIRE COVER.
APPLICATION FILED SEPT. 9, 1904.
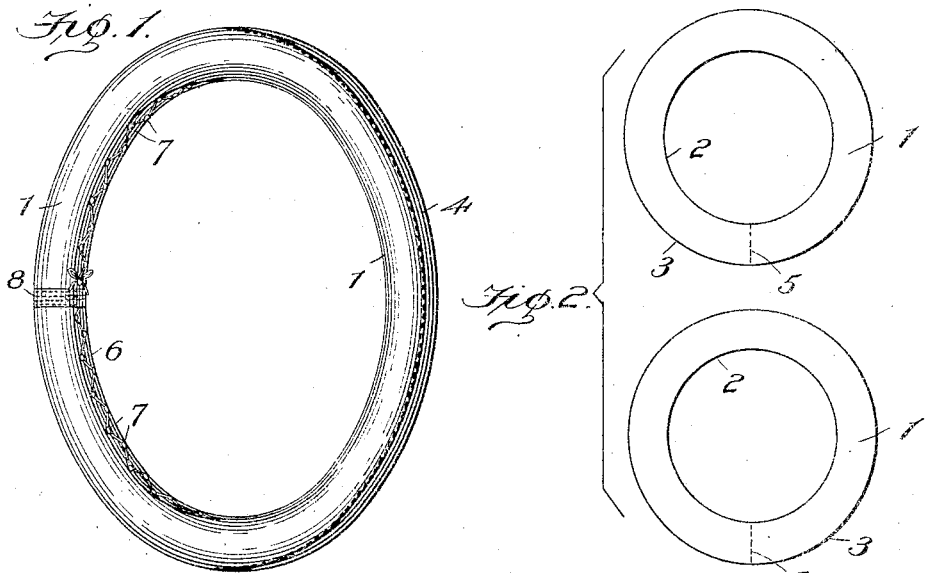
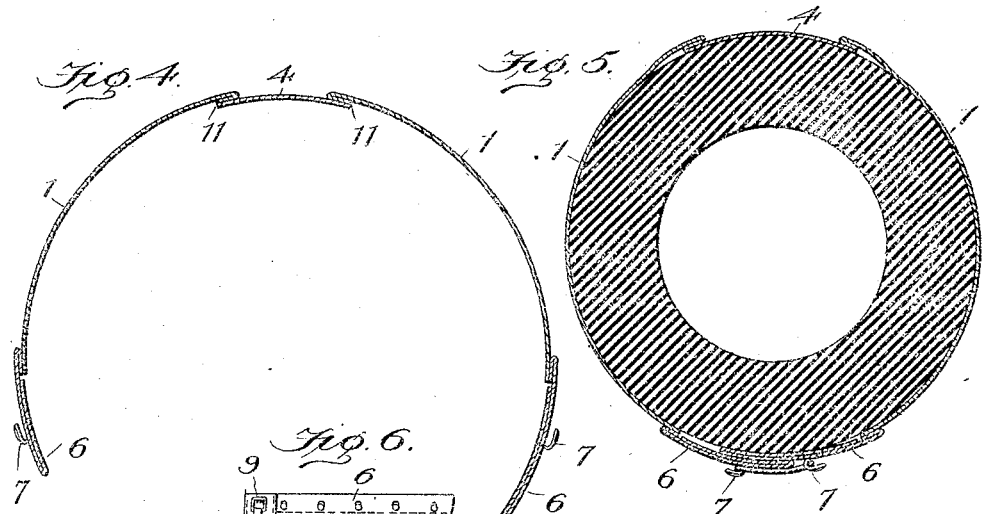
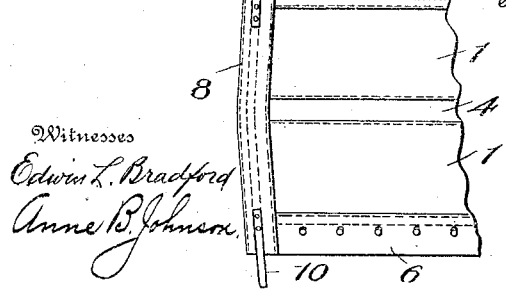
Witnesses
Edwin L. Bradford
Anne B. Johnson
Inventor
Fredson E. Bowers
By Johnson & Johnson
Attorneys No. 779,578.

Patented January 10, 1905.

UNITED STATES PATENT OFFICE.

FREDSON E. BOWERS, OF NEW HAVEN, CONNECTICUT.

TIRE-COVER.

SPECIFICATION forming part of Letters Patent No. 779,578, dated January 10, 1905.

Application filed September 9, 1904. Serial No. 223,858.

*To all whom it may concern:*

Be it known that I, FREDSON E. BOWERS, a citizen of the United States, residing at New Haven, in the county of New Haven and State of Connecticut, have invented certain new and useful Improvements in Tire-Covers; and I do hereby declare the following to be a full, clear, and exact description of the invention, such as will enable others skilled in the art to which it appertains to make and use the same.

In automobiling an extra tire with the machine is a wise precaution, and to carry one on the machine without a proper covering causes it to deteriorate from exposure to water, dust, oil, moisture, and is otherwise rendered liable to be injured.

My invention is directed to giving the extra tire protection in a practicable way by the provision of a cover having a novel construction made to inclose and conform to the tire without a wrinkle, whereby it may be carried as an ornament on the machine. The case can be put on and removed from the tire in a few minutes.

The accompanying drawings illustrate in Figure 1 an incased wheel-tire. Fig. 2 shows in side view two rings cut from fabric of equal width and diameter. Fig. 3 shows, enlarged, a strip of the same material of a length equal to the outline circumference of the rings and of unvarying width. Fig. 4 is a cross-section showing the casing partially open. Fig. 5 shows a cross-section of the tire and its inclosing case. Fig. 6 is an outside view of a portion of the case.

The case is formed of three parts, two of which are rings 1 1 of the same diameter and width cut from a sheet of suitable fabric, such as black enamel, the inner and outer edges 2 and 3 of each ring being true circles. The third section is a strip 4 of the same material, having a length equal to the circumference of the rings and of a width about one-third that of the full-size ring and which I call the "crown-strip," because it is for forming the arch or tread which unites the rings at their outer edges and gives the correct curve to conform to the tread of the incased tire. For this purpose this crown-strip has straight edges and is of the same width from end to end, and it is by reason of such form when its straight edges are united to the outer circular edges of the side rings that the three united parts form in their transverse section a true circle without wrinkles when the rings are united at their inner edges.

The rings are cut radially, as at 5, to allow them to be opened, and the crown-strip is stitched by inner hems 11 to the outer circular edge of each ring. To the inner circular edge of each ring is stitched a straight narrow binder-strip 6, folded to give strength to hold the hooks 7 in lacing these folded strips so that their edges lap at the inner circle of the incased tire. The ends of the rings are reinforced by transverse folded binders 8 8, stitched to the cut ends of the rings and to the ends of their edge binders, and each of these end binder-strips is provided with a buckle 9 and a strap 10, by which the case is secured at its meeting ends.

The cases are made to fit different-size tires, and in applying it place one end over the tire, fasten the strap at that end, and roll the tire around until the case is on. Then draw up tightly until the case is smooth, letting one binder overlap the other, and fasten the strap at the overlapping binder. The lacing-string is then applied, lacing from hook to hook, drawing one binder tightly over the other and tying the lacing ends when they meet, causing the case to fit without a wrinkle, which after much experimenting I found that this result could only be obtained by uniting two circular sides with a straight crown-strip or tread.

I claim—

1. As a new article of manufacture, a fabric tire case or cover, consisting of a circular tubular case of three parts, two sides of identical ring form and a narrow crown-strip having parallel edges uniting the circumferential circular edges, the inner circular edges meeting in a longitudinal seam, a lacing for said seam and buckle-and-strap fastenings for the meeting ends of the case.

2. A tire case or cover consisting of three parts, two of which are of identical ring form, the third having the form of a parallelogram, the edges whereof are united to the outer edges of the rings, and means for fastening the inner ring edges.

In testimony whereof I have signed my name to this specification in the presence of two subscribing witnesses.

FREDSON E. BOWERS.

Witnesses:
   JEREMIAH F. DONOVAN,
   MATTHEW A. REYNOLDS.